United States Patent
Ando et al.

(10) Patent No.: US 7,021,538 B2
(45) Date of Patent: Apr. 4, 2006

(54) FORM PROCESSING SYSTEM AND METHOD

(75) Inventors: Munehiro Ando, Yokohama (JP); Tadashi Igarashi, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 226 days.

(21) Appl. No.: 10/684,791

(22) Filed: Oct. 14, 2003

(65) Prior Publication Data

US 2004/0118908 A1    Jun. 24, 2004

(30) Foreign Application Priority Data

Oct. 16, 2002    (JP) .............................. 2002-301761

(51) Int. Cl.
*G06F 17/60*    (2006.01)

(52) U.S. Cl. .......................... 235/385; 235/375; 705/1; 700/131

(58) Field of Classification Search ................. 235/385; 705/1; 700/131, 132, 134
See application file for complete search history.

(56) References Cited

U.S. PATENT DOCUMENTS 5,680,314 A * 10/1997 Patterson et al. ........... 700/132
5,768,135 A * 6/1998 Park et al. .................. 700/130
6,891,595 B1 * 5/2005 Oka et al. ..................... 355/40

FOREIGN PATENT DOCUMENTS

| JP | 5-20339 | 1/1993 |
|---|---|---|
| JP | 06-060269 | 3/1994 |
| JP | 07-175863 | 7/1995 |
| JP | 9-259360 | 10/1997 |
| JP | 10-157243 | 6/1998 |
| JP | 11-184939 | 7/1999 |
| JP | 2001-282496 | 10/2001 |
| JP | 2001-350755 | 12/2001 |
| JP | 2002-073652 | 3/2002 |

* cited by examiner

*Primary Examiner*—Karl D. Frech
*Assistant Examiner*—Seung H Lee
(74) *Attorney, Agent, or Firm*—Mark P. Watson

(57) ABSTRACT

A form processing system makes it easier to handle forms generated in conjunction with product sales and thereby improves overall productivity. This form processing system processes forms generated in conjunction with product sales using a form printer 4 as a form printing unit for printing forms using a form format suitable to the product purchased by a customer and specific form configuration data that is added to the form format. A receipt generator 5 used as a form reading unit then reads a completed form and generates form image data from the completed form. The completed form is a form that was printed by the form printer and then had additional information relating to the product sale recorded on the form. A form management database 20 used as a form image storage unit then stores the form image data generated by the receipt generator 5. The productivity of forms processing and management is thus improved.

20 Claims, 13 Drawing Sheets

FORM MANAGEMENT DATABASE

| | (TABLES) | (DATA FIELDS) |
|---|---|---|
| 20a | CUSTOMER INFORMATION TABLE | customer code<br>name (reading)<br>address, postal code, telephone number<br>customer history |
| 20b | PRODUCT INFORMATION TABLE | product code<br>form link data<br>manufacturer name<br>product-specific information (profile, other)<br>price |
| 20c | FORM FORMAT TABLE | form formats corresponding to product type (men's, women's, children, infant) |
| 20d | FORM FIELD CODE TABLE | form field codes |
| 20e | MEASUREMENT INFORMATION TABLE | measurement image data<br>names of measured places |
| 20f | FORM NUMBER TABLE | form number |
| 20g | FORM COORDINATE DATA TABLE | form coordinates data<br>(for individual form components) |
| 20h | DELIVERY INFORMATION TABLE | delivery date<br>delivery/pickup location |
| 20i | TRANSACTION INFORMATION TABLE | transaction number<br>transaction date/time |
| 20j | PRODUCT ADJUSTMENT INFORMATION TABLE | adjustment type<br>price |
| 20k | FORM IMAGE DATA TABLE | form image data<br>(complete image/partial image) |
| 20l | UPDATE GUIDANCE INFORMATION TABLE | form update information<br>department distribution list |

Seiko Department Store
Seiko Department Store
Kotobuki Koaka 101,
Matsumoto, Nagano-ken
Tel: 0263-11-0001

Thank you for shopping at Seiko.
Open every day this month.

RECEIPT

No.     02091900011
2002 Sept 20 Friday 11:11
Clerk: Seiko Taro

| | | | |
|---|---|---|---|
| 0011 | Suit | 1 | ¥56,000 |
| 2001 | Raise hem | 1 | ¥1,000 |
| 2002 | Adjust waist | 1 | ¥1,500 |
| 3001 | Button | 6 | ¥1,800 |
| 2002 | Sew buttons | 1 | ¥2,000 |

| | |
|---|---|
| Subtotal | ¥62,300 |
| Tax | ¥3,115 |
| TOTAL | ¥65,415 |

| | |
|---|---|
| Customer number | 001122334455 |
| Points earned today | 35 |
| Accumulated points | 315 |
| Customer name | Tanaka Hanako |

FIG.12

FORM PROCESSING SYSTEM AND METHOD

BACKGROUND OF THE INVENTION

1. Field of the Invention

The present invention relates in general to a form processing system and method for processing forms generated in conjunction with marketing and sales. More particularly, the invention relates to a form processing system and form processing method for performing various tasks based on a completed form in, for example, a retail store that sells clothing and other products to customers where forms with information having a format depending on the product are preprinted and then completed with additional information such as adjustments to be made to the clothing.

2. Description of the Related Art

Stores that sell apparel and other such products have typically used forms to record and confirm various information about their products and customers as part of the product sales. Preprinted forms designed and formatted according to the particular product type are typically used. The color of the form may be changed according to the product type, and different forms may show the shape or profile of a particular product. Numerous different forms may therefore be used in a single store.

If tailoring is required to fit clothing to the customer's size and shape, for example, the store clerk typically takes the customer's measurements and writes the results in specific places on the appropriate form. Other information typically also recorded on the form includes information about the customer and delivering the product to the customer after it is finished.

These forms are also often multipart forms so that multiple copies of the same form and information can be easily obtained. When the product is paid for one of these copies is used as a receipt given to the customer while the other copies are filed or passed to another department for reference in completing the job, such as making adjustments to the clothing. Forms thus have an important role when performing tasks arising from product sales.

Because of the extremely wide range of products a store may carry, however, using forms as described above can sometimes interfere with a smooth work flow. It takes time to find the form that is used for the particular product purchased by a customer, for example, and filing and storing processed forms can be complicated, thus increasing personnel costs. There is also the cost of having a printing company print a large number of multipart forms, and the increased work and time delay resulting from delivering forms to different departments. Handling and processing forms generated in conjunction with product sales is therefore a problem that lowers overall productivity.

The present invention is directed to solving these problems, and an object of our invention is to provide a form processing system and form processing method that can reduce the workload of handling forms generated in conjunction with product sales, hold down costs required for processing and managing forms, and improve the productivity of form processing by printing forms on demand and digitizing form images.

SUMMARY OF THE INVENTION

To achieve this object, a form processing system of our invention for processing forms generated in conjunction with product sales has a form printing unit or form printing means for printing a form using a form format suitable to the product purchased by a customer and specific form configuration data added to the form format; a form reading unit or form reading means for reading a completed form having additional information relating to a product sale recorded on a form previously printed by the form printing unit or form printing means, and generating form image data; and a form image storage unit or form image storage means for storing form image data generated by the form reading unit or form reading means.

After a customer decides on what product to purchase, the form printer in the form processing system of this invention can print a form appropriate to the selected product using a specified form format and form configuration data, and the salesperson can therefore quickly acquire the desired form. The salesperson then records certain information, such as measurements for adjusting an article of clothing, onto the printed form and runs the completed form through a scanner. The scanner produces digital form image data that can then be stored in a form image storage unit or form image storage means. The digital image of the form can then later be easily referenced as needed to perform other tasks, such as making the clothing adjustments. The form processing system of this invention thus eliminates the need to prepare and use numerous preprinted multipart forms, as well as the troublesome task of storing and managing paper forms, and greatly improves the overall productivity of handling forms generated in conjunction with product sales.

Preferably, the form processing system also has a receipt generating unit or receipt generating means for generating a receipt containing sales transaction information for a purchased product. Together with this sales receipt, the receipt generating unit or receipt generating means generates an exchange receipt containing a partial image of the completed form.

The receipt generating unit or receipt generating means of this configuration produces a sales receipt when payment is made together with a related exchange receipt so that both can be given to the customer. By including payment transaction information on the sales receipt and selected image parts of the completed form on the exchange receipt, useful information can be conveyed to the customer.

Yet further preferably, the receipt generating unit or receipt generating means cuts (as in "cut and paste") a specific area from the form image data generated by the form reading unit or form reading means to extract a part of the image, and generates the exchange receipt using exchange receipt printing data into which the extracted part of the form image data has been pasted.

The exchange receipt is thus produced with the partial image data cut from a specified area of the form image data pasted into the exchange receipt printing data. Selected components of the completed form can thus be shown in the exchange receipt by means of a relatively simple process.

The form configuration data could include customer information about a registered customer. The customer information can thus be easily recognized by referring directly to the form or the exchange receipt in which the customer information has been pasted.

Further preferably, the form configuration data includes product information about a product for sale. This enables easy confirmation of information about the product by referring to the form or to the exchange receipt containing the pasted product information. This is convenient for both the customer and the salesperson.

Yet further preferably, the product information includes product-specific information such as a product profile to be displayed on a form. Information such as the product shape that makes it simple to identify the product can thus be acquired at a glance by referring to the form directly or to the exchange receipt containing the pasted product information.

Yet further preferably, the form configuration data includes measurement information useful for identifying information related to the customer's measurements taken when the purchased product is clothing. An image showing the measurements and where the measurements were taken can thus be easily confirmed by referring to the form directly or to the exchange receipt in which the measurement information has been pasted.

Yet further preferably, the form configuration data includes barcodes corresponding to data to be displayed on a form, and the form reading unit or form reading means has a barcode reader for reading the barcodes.

Barcodes can thus be easily shown on the form and can be read by the barcode reader of the form reading unit or form reading means so that specific data important to form processing can be easily read and acquired.

Yet further preferably, the barcodes include barcodes for product codes assigned to individual products, and barcodes for form numbers assigned to individual forms. A specific form can therefore be easily identified by reading the form number barcode, and the product referred to by the form can be easily determined by simply reading the product code barcode.

Yet further preferably, the form printing unit or form printing means, form reading unit or form reading means, and form image storage unit or form image storage means are connected to a common network, and a terminal connected to the network can reference the form image data stored in the form image storage unit or form image storage means.

Form processing thus goes more smoothly as a result of the components of this form processing system exchanging information over a network, and other terminals also connected to the network can easily reference the form image data and other information as needed for use in other tasks.

The object of the invention can also be achieved by a form processing method for processing forms generated in conjunction with product sales. This form processing method has a form printing step for printing forms using a form format suitable to a the product purchased by a customer and specific form configuration data added to the form format for printing; a form reading step for reading a completed form having additional information relating to a product sale recorded on a form previously printed by the form printing step, and generating form image data from the completed form; and a form image storage step for sequentially storing the form image data generated by the form reading step to a specific storage means.

A form processing method having these steps achieves the same effect as the form processing system described above, and thus helps improve the productivity of handling forms generated in conjunction with product sales.

A further form processing method according to the present invention for processing forms generated in conjunction with product sales has a form printing step for printing a form using a form format suitable to the product purchased by a customer and specific form configuration data that is added to the form format; a form reading step for reading a completed form having additional information relating to a product sale recorded on a form previously printed by the form printing step, and generating form image data; a receipt generating step for issuing a receipt containing sales transaction information, and an exchange receipt containing an image of part of the completed form; and a form image storage step for sequentially storing the form image data generated by the form reading step to a specific storage means.

This form processing method also achieves the same effect as the form processing system described above, and enables the easy conveyance of useful information to the customer.

Preferably, the receipt generating step comprises a cut step for cutting a specific area from the form image data generated in the form reading step and extracting partial image data; and a paste step for generating an exchange receipt using exchange receipt printing data into which the partial image data was pasted.

This form processing method also achieves the same effect as the form processing system described above, and can show desired parts of the completed form on an exchange receipt using a relatively simple process.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 shows the data structure of a form management database;

FIG. 7 is a print sample of a form printed by the form printing process;

FIG. 8 shows the form in FIG. 7 after additional information has been recorded on the form;

FIG. 12 is a print sample of the sales receipt; and

DESCRIPTION OF THE PREFERRED EMBODIMENTS

A preferred embodiment of the present invention is described below with reference to the accompanying figures. This embodiment applies the present invention to a form processing system used for form processing in a store that sells apparel to retail customers.

Figure 1:
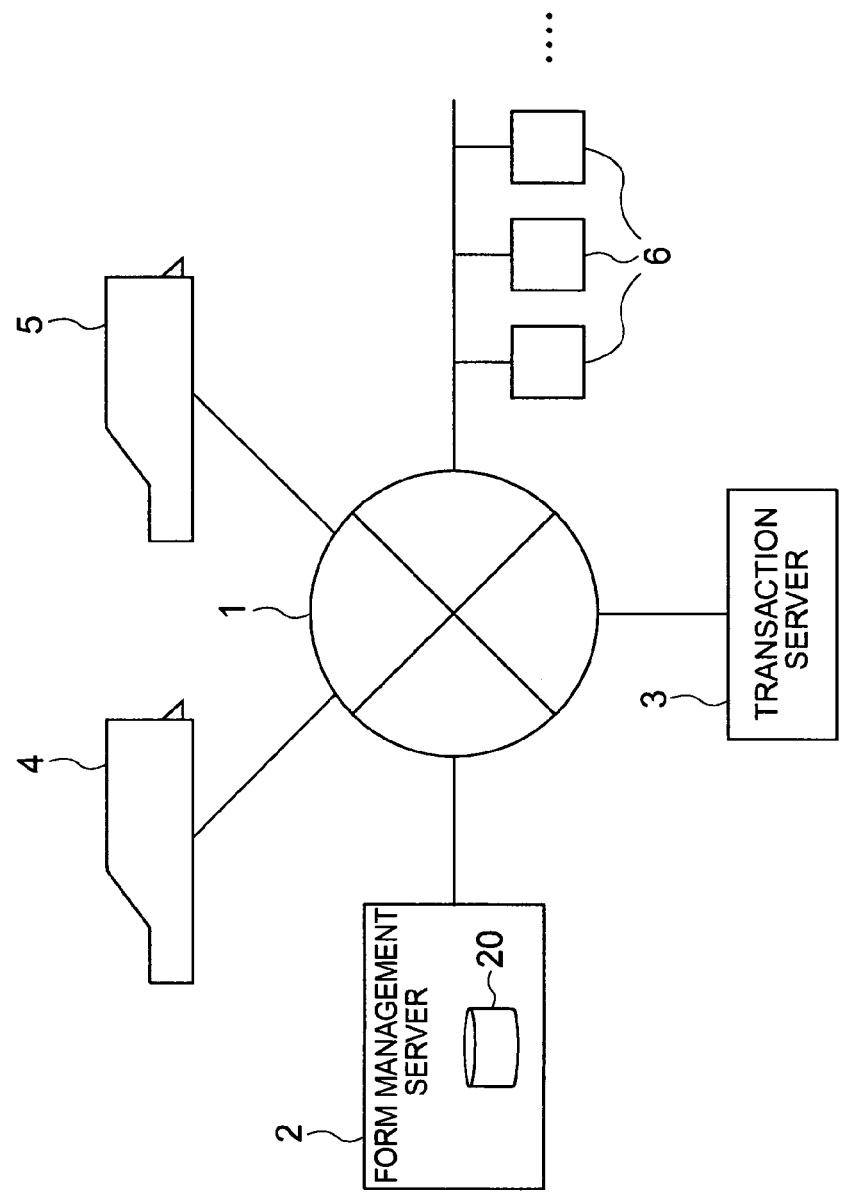
FIG. 1 is a schematic diagram showing the configuration of a form processing system according to a preferred embodiment of the invention.

FIG. 1 is a system diagram showing an overview of a form processing system according to this embodiment of the invention. As shown in FIG. 1 this form processing system is built with the various system components connected over a network 1. The system includes a form management server 2 for centrally managing form processing, a transaction server 3 for managing sales transactions in the store, a form printer 4 for printing the desired form, and a receipt generator 5 for reading a form after all required information has been completed and generating a receipt to be given to the customer, for example. This form processing system also has multiple sales terminals 6 located in different departments and connected over a network 1 so that information can be shared.

The form printer 4 and form management server 2 shown in FIG. 1 together function as the form printing unit or form printing means of the accompanying claims. The receipt generator 5 and form management server 2 together function as the form reading unit or form reading means and receipt generating unit or receipt generating means of the accompanying claims.

The form management server 2 is the core of this form processing system, and the form management database 20 stored in the form management server 2 functions as the form image storage unit or form image storage means of the accompanying claims.

The form management server 2 of this form processing system provides overall management of form processing, and sequentially runs software to perform the required processes. As shown in FIG. 1 the form management server 2 includes a hard disk, for example, to physically store the form management database 20 in which the information that is managed by the form processing system is recorded. The specific data structure of this form management database 20 is further described below.

The transaction server 3 provides overall management of the payment process executed when selling merchandise to a customer, and sequentially runs software for handling payment transactions. The form management server 2 and transaction server 3 have the same hardware configuration, which includes a CPU, monitor, memory, and an interface to the network 1, which are not shown for simplicity.

The form printer 4 of this form processing system is for printing on demand a specific form appropriate to the product purchased by the customer based on form printing data sent from the form management server 2 when the customer buys a specific product.

Figure 2:
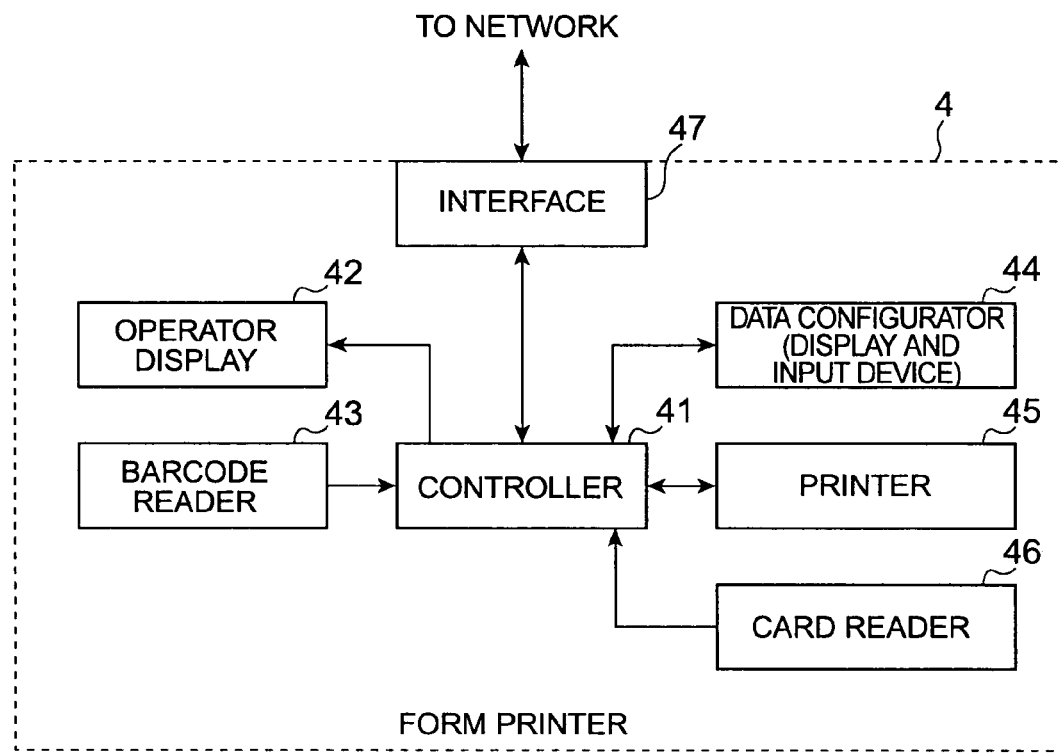
FIG. 2 is a block diagram of the form printer.

FIG. 2 is a block diagram showing the configuration of the form printer 4. As shown in FIG. 2 this form printer 4 has a controller 41, operator display 42, barcode reader 43, data configurator 44, printer 45, card reader 46, and interface 47.

In the example shown in FIG. 2 the controller 41 has a CPU for controlling operation of the form printer 4 and memory used for processing operations, and sends control signals to other parts of the form printer 4 to perform specific functions. The controller 41 is connected to the network 1 through interface 47, and communicates with the form management server 2 when printing forms. It should be noted that only one example of a form printer 4 is shown in FIG. 2, but, alternatively, it could be a printer 45 connected to a terminal comprising a personal computer having the controller 41 and interface 47, and other components.

The operator display 42 functions as a display means for displaying form images obtained in a process described below in response to operations by the salesperson or other operator.

The barcode reader 43 is for reading barcodes on the products sold by the store.

The data configurator 44 has a display for presenting prompts and messages to the user, and a touch panel, keyboard, or other input device. The data configurator 44 is used by the operator to set specific data for the form printer 4.

The printer 45 prints a hard copy of the desired form according to the above-noted form printing data obtained for printing. A printer 45 with color printing capability is preferable so that the color of the form can be changed according to the type of product.

The card reader 46 is for reading a magnetic stripe card such as a frequent-customer card issued to and carried by a registered customer.

Figure 3:
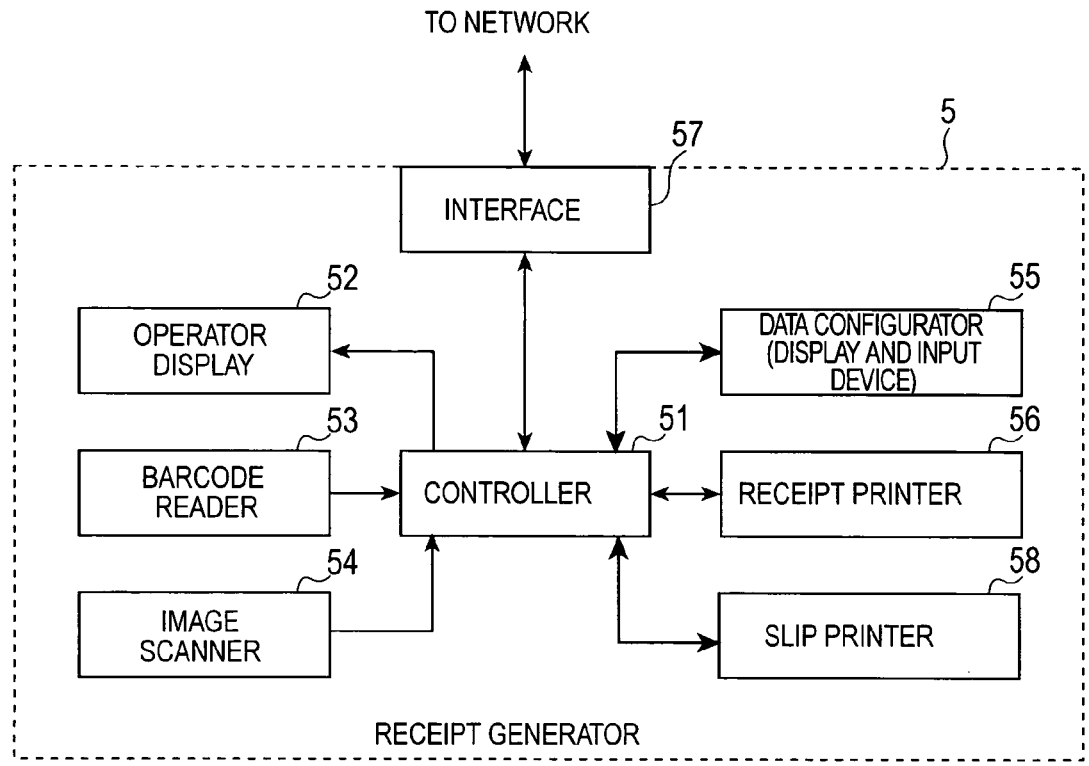
FIG. 3 is a block diagram of the receipt generator.

After a salesman writes additional information such as the clothing adjustments to be made on the form printed by the form printer 4, the receipt generator 5 of this form processing system reads (scans) the completed form, generates a sales receipt, and issues an exchange receipt containing at least part of the form content. FIG. 3 is a block diagram showing the configuration of this receipt generator 5.

As shown in FIG. 3 the receipt generator 5 has a controller 51, operator display 52, barcode reader 53, image scanner 54, data configurator 55, receipt printer 56, interface 57, and slip printer 58.

As shown in FIG. 3 the controller 51 has a CPU for controlling operation of the receipt generator 5, and memory for internal operations, and sends control signals to the other parts of the receipt generator 5 to perform specific functions. The controller 51 is connected to the network 1 through interface 57, and communicates with the form management server 2 when reading forms and generating receipts, and communicates with the transaction server 3 to exchange transaction data in the product purchasing process.

The operator display 52 has the same function as the operator display 42 of the form printer 4, and displays, for example, the printed receipt.

The barcode reader 53 is used to read barcodes from forms printed by the present embodiment with barcodes containing the product code and form tracking number, for example, as further described below.

The image scanner 54 scans a form that has been filled in by a salesman with additional information such as clothing adjustments to be made (such forms are referred to below as "completed forms") to capture an image of the completed form and generate digital form image data.

Like the data configurator 44 of the form printer 4, this data configurator 55 has a display and an input device, and is used to specify specific information.

The receipt printer 56 prints a receipt containing the transaction data sent from the transaction server 3 according to a process described below, and an associated exchange receipt for the customer.

A digitizer or other means of generating a digital image of the form can be used instead of the image scanner 54. The receipt printer 56 used in this embodiment prints on roll paper and has an autocutter for cutting the paper. The slip printer 58 is for printing on single forms and paper slips.

The structure of the form management database 20 managed by the form management server 2 is described next. FIG. 4 shows the data structure of the form management database 20 in this embodiment of the invention.

As shown in FIG. 4 the form management database 20 has multiple tables for storing the information needed for form processing by this form processing system. In this embodiment of the invention these tables include: customer information table 20a, product information table 20b, form format table 20c, form field code table 20d, measurement information table 20e, form number table 20f, form coordinate data table 20g, delivery information table 20h, transaction information table 20i, product adjustment information table 20j, form image data table 20k, and update guidance information table 20l.

As also shown in FIG. 4, the customer information table 20a stores customer information relating to customers registered with the store. This customer information includes a customer code unique to each customer, name and how it is read in the case of names written in Japanese kanji, for example, address, postal code, telephone number, and purchasing history. As more completely described below, a customer card is assumed to be issued for each customer that has been registered in the customer information table 20*a*, and the customer information obtained from the customer when the card is issued (the customer is registered) is stored in the customer information table 20*a*.

The product information table 20*b* stores product information about the products sold by the store. This product information includes the assigned product code uniquely identifying each product, a form link to the form type matching the product code during the form printing process, the product manufacturer, product-specific information such as the product shape shown on the form, and the product price. Product information for a specific product can be retrieved from the product information table 20*b* using the product code extracted from a barcode attached to each product.

The form format table 20*c* stores-the multiple form formats required for form printing by the form printer 4. Multiple form formats specifying different colors and form content according to the product type are stored. Form formats can be freely designed for specific product types. For example, nine form formats, including three for men's clothing, four for women's clothing, and one each for infant and children's clothing, could be prepared for a clothing store. A specific example of a form printed from one exemplary form format is further described below.

The form field code table 20*d* stores form field codes identifying the form configuration data (described below) for a desired form when generating the form printing data used in the printing process of the form printer 4. The required form field code is identified from the form link data retrieved from the product information table 20*b*.

The measurement information table 20*e* stores measurement information collected by taking the customer's measurements when a custom order is received. This measurement information is used to identify the measurements and related information, and includes an image for graphically identifying where measurements were taken, and measurement names defining the places where customer measurements were taken. An example of how this information is shown on the form is described below.

The form number table 20*f* stores the form numbers assigned for identifying each form printed by the form printer 4. The form number is displayed by a barcode attached to each form, and the form number can therefore be easily read from the form itself or from the form image data.

The form coordinate data table 20*g* stores the form coordinates obtained by the receipt generator 5 as further described below. These form coordinates define the area to be cut (as in "cut and paste") from the form image data read from the completed form. If the form coordinates are set according to the form format, the image cropping process can use form coordinates specific to form formats for different display content.

The delivery information table 20*h* stores delivery information linked to each form. This delivery information is given to the customer and indicates how the product is to be delivered to the customer after the clothing adjustments are made when the product purchased by the customer requires adjusting. This delivery information includes the completion (delivery) date and where the customer is to get the product. This delivery information must be updated according to the product and work status.

The transaction information table 20*i* stores transaction information linked to a specific form and relating to the transaction process executed by the transaction server 3 when a receipt is issued. This transaction information includes a transaction number assigned to uniquely identify each transaction, and the transaction date and time.

The product adjustment information table 20*j* stores product adjustment information relating to the adjustments to be made to each product and linked to a particular form. The product adjustment information includes the adjustment type describing the product adjustments to be made, and the adjustment price, which is the amount to be paid based on the type of adjustment made.

The form image data table 20*k* stores form image data generated by the receipt generator 5 in the reading process described below. The form image data is also stored with a link to a particular form. The form image data is normally an image of the entire form, but it is also possible to scan and digitize only specific parts of the form and store only those selected parts in the form image data table 20*k*.

The update guidance information table 20*l* stores the update guidance information needed to inform other departments that new form image data is available when the content of the form image data table 20*k* has been changed. This update guidance information includes form update information containing the information to be reported to the related departments, and a distribution list of the departments that should reference the updated form image data.

Form processing by a form processing system according to this preferred embodiment of the invention is described next with reference to FIG. 5 to FIG. 13. After a customer visits a store and decides upon a product to purchase, a form appropriate to the purchased product is printed, the clerk fills in the required information on the form, the completed form is then read, and a sales receipt and exchange receipt to be given to the customer are generated by the processes described below. The form process described below is interactively executed by the form management server 2, transaction server 3, form printer 4, and receipt generator 5 connected to the network 1.

Figure 5:
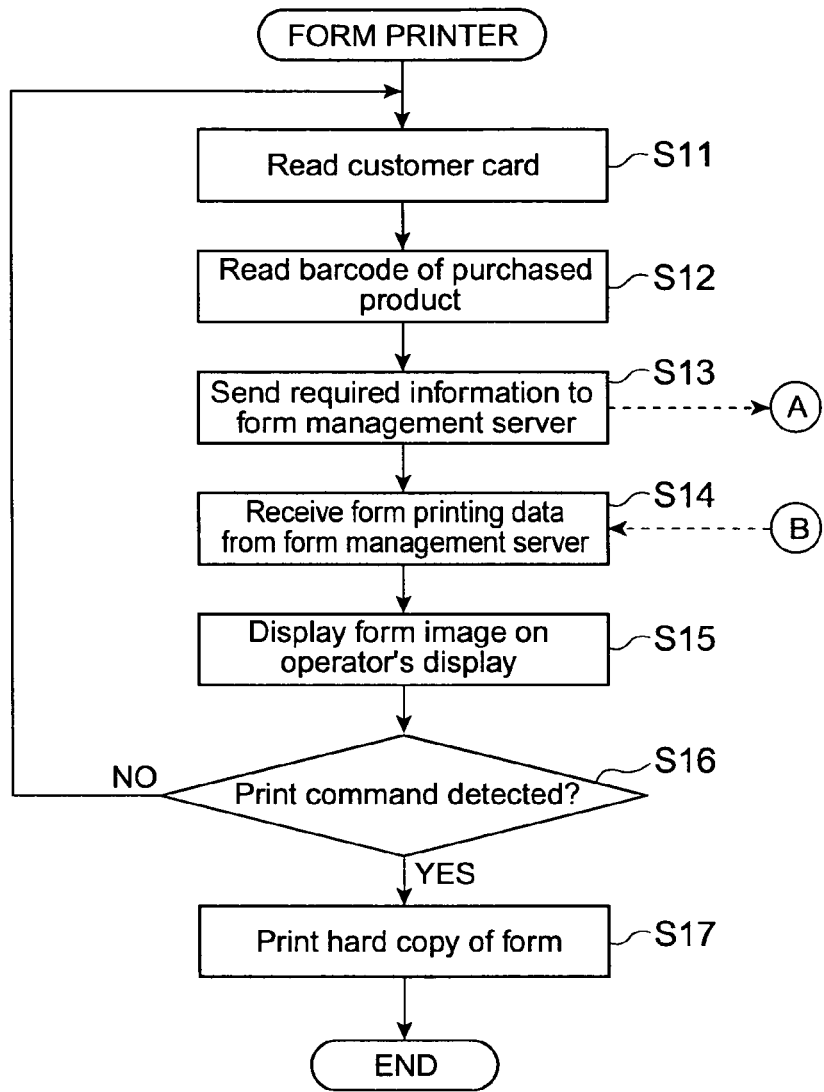
FIG. 5 is a flow chart of the part of a form printing process run by the form printer.
Figure 6:
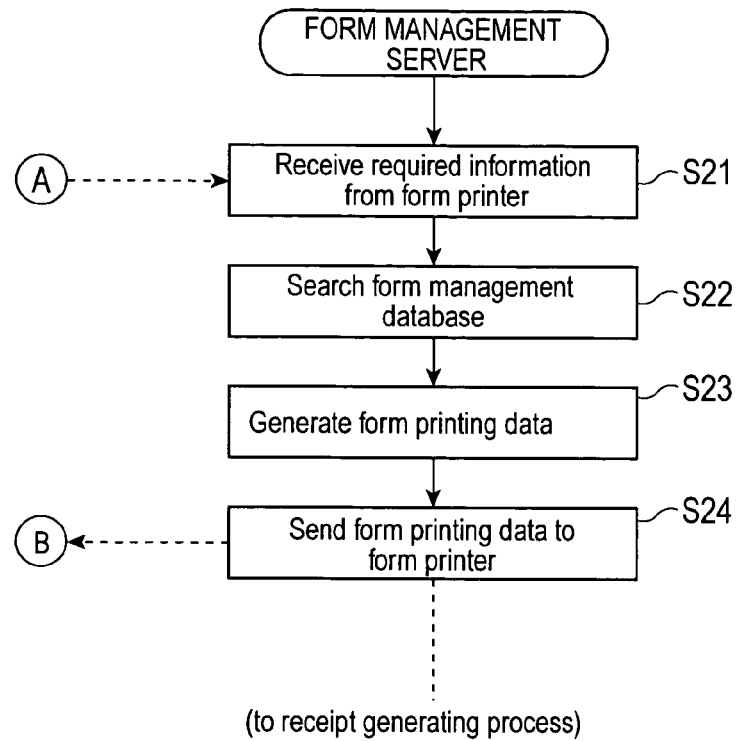
FIG. 6 is a flow chart of the part of a form printing process run by the form management server.

Of the processes performed by this form processing system, the form printing process for printing the form appropriate to the products purchased by a customer is described first with reference to FIG. 5 and FIG. 6. This form printing process is executed primarily by the form printer 4 and form management server 2. FIG. 5 is a flow chart of the part of the form printing process run on the form printer 4 side. FIG. 6 is a flow chart of the part of the form printing process run on the form management server 2 side.

As shown in FIG. 5, once a customer holding a customer card decides upon what product to purchase, the customer card is read by the card reader 46 of the form printer 4 (step S11) to get the customer code recorded magnetically on the customer card.

If the customer does not have a customer card, this step S11 is skipped and the process proceeds from step S12. When a customer card is issued to a customer by the store as described above, a form format to which the customer information is added from the form management database 20 is used, and the customer code is therefore required. If the customer does not have a customer card a form is printed without any customer information in this embodiment. The content of the printed form thus varies according to whether a customer card is available.

The barcode attached to the purchased product is then read by the barcode reader 43 of the form printer 4 (step S12) and the product code of the purchased product is extracted. The controller 41 then sends the customer code extracted in step S11 and the product code extracted in step S12 to the form management server 2 as the information required for further processing by the form management server 2 (step S13).

As shown in FIG. 6, this information, that is, the customer code and product code, is then received by the form management server 2 over the network 1 (step S21). The form management server 2 then searches the form management database 20 (step S22). More specifically, the form management server 2 accesses the form management database 20 and finds the record containing the product code received in step S21, and reads the form link data from the matching product code record. The specific form field code indicated by the form link data can thus be identified.

The form format and other form configuration data needed to generate form printing data for the product code are then determined based on the resulting form field code, and this information is then used to generate form printing data (step S23). The form printing data from step S23 is then sent to the form printer 4 over network 1 (step S24). The form format and form configuration data contained in the form printing data can be set to contain content specific to the type of form and how it is used. A method of configuring, the form format and form configuration data is described further below.

Returning to FIG. 5, the form printing data sent from the form management server 2 is received by the form printer 4 (step S14). The controller 41 then displays a form image according to the received form printing data on the operator display 42 (step S15). The operator can then visually confirm if the content and form to be printed are correct by simply reading the operator display 42.

If the operator confirms that the correct form will be printed and asserts a print command using the input device of the data configurator 44 (step S16 returns yes), the printer 45 runs a printing process using this form printing data and thus prints a hard copy of the desired form (step S17). The salesman can thus obtain the appropriate form for the product purchased by the customer.

If the operator determines from the form image that the appropriate form has not been selected, a cancel command is asserted instead of a print command using the input device of the data configurator 44 (step S16 returns no), and steps S11 to S15 repeat.

Figure 7:
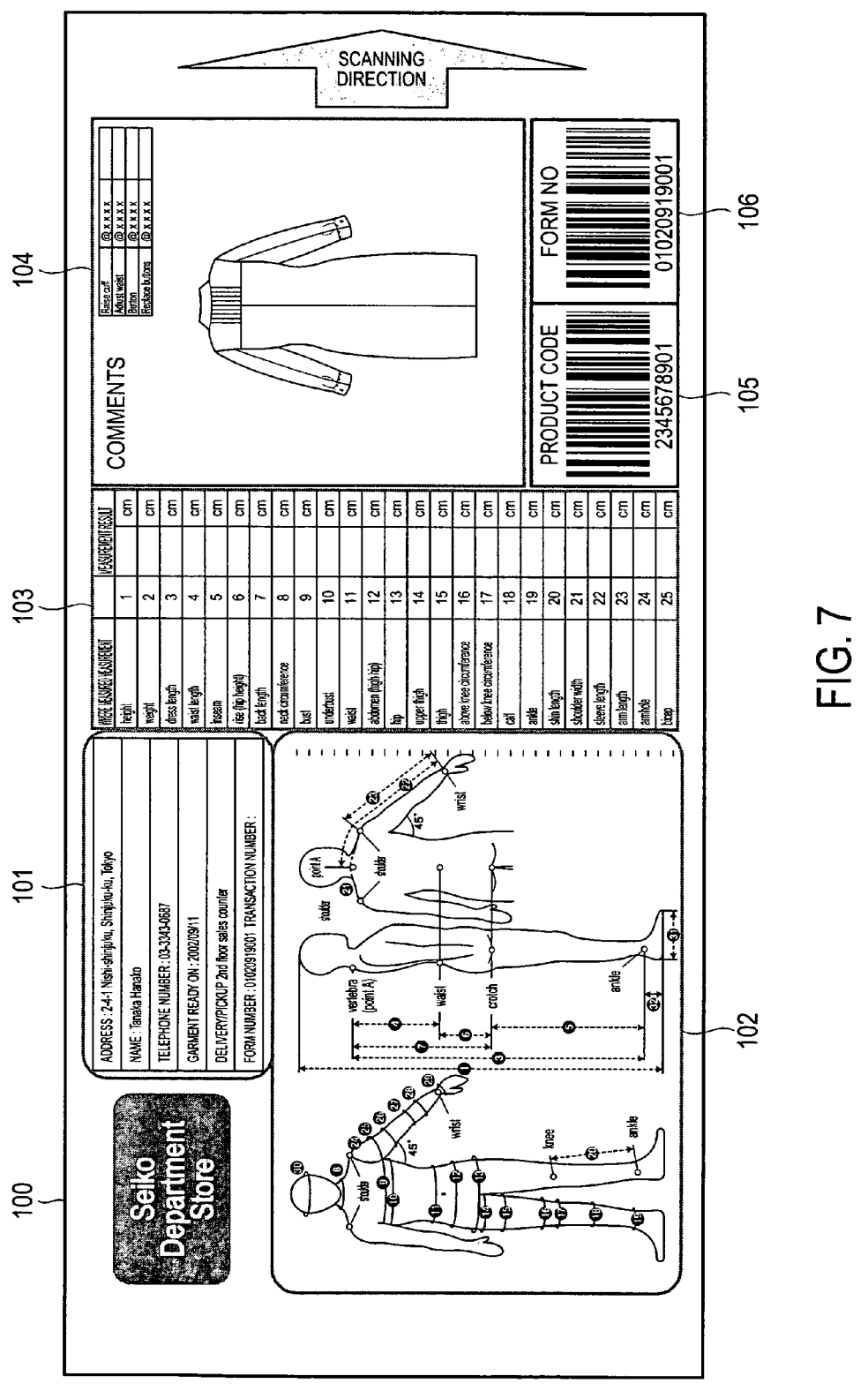

A specific example of a form printed by the processes shown in FIG. 5 and FIG. 6 is described next while also describing the form format of the printed form and the form configuration data. FIG. 7 shows an example of a form printed by the form printer 4. This form is used with a specific type of clothing, i.e., women's clothing in this example.

The form shown in FIG. 7 has various form configuration data added to a form format containing the predefined form pattern, color, frames, and specific text information (such as the form name and store name). More specifically, the form shown in FIG. 7 starts with a basic form format 100 and contains specific form configuration data added to frames 101 to 106. The form format for the form shown in FIG. 7 preferably enables the text information and the color of each frame to be changed according to the product type so that different types of forms can be readily identified.

As shown in FIG. 7 frame 101 contains personal information, delivery information, and a form number; frame 102 contains measurement identification information; frame 103 contains measurement name and result information; frame 104 contains product-specific information (such as an outline of the product); frame 105 contains the product code in both human-readable and barcode formats; and frame 106 contains the form number in both human-readable and barcode formats.

The form format 100 and form configuration data shown in frames 101 to 106 in FIG. 7 is read from the appropriate tables in the form management database 20, and when combined they constitute the form printing data.

The content of the form can be changed by changing the combination of form field codes.

Figure 8:
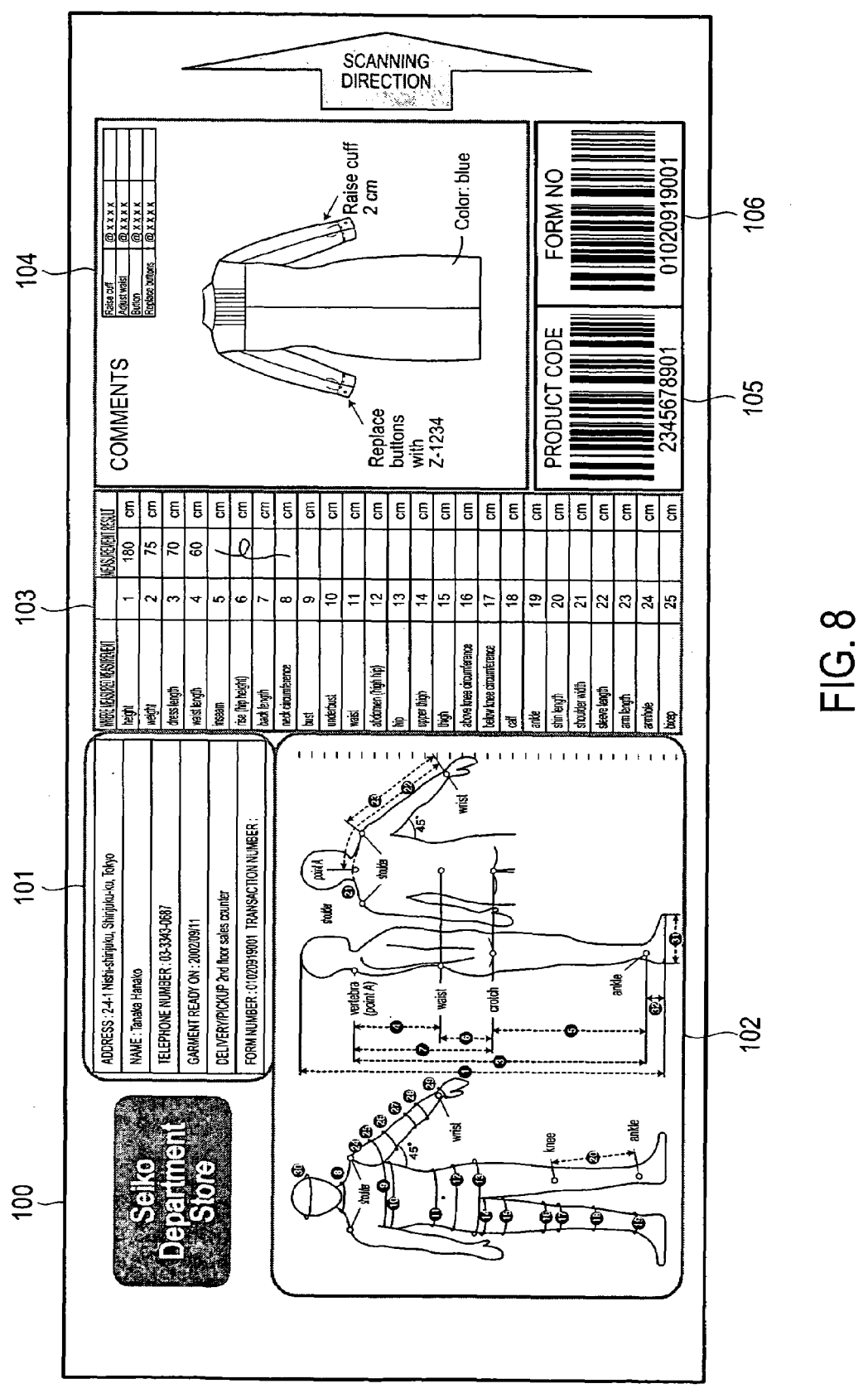

After the desired form is printed as described above, the salesman must complete the form by writing the additional information, including the adjustments to be made, onto the form. FIG. 8 shows an example of the form shown in FIG. 7 after this additional information has been recorded. FIG. 8 shows the handwritten notes added to frames 103 and 104 of the form shown in FIG. 7. More specifically, after the salesman takes measurements for the adjustments to be made, the values of those measurements are recorded on the appropriate lines in frame 103 of the form. Notes indicating specific changes and adjustments are also written near where the adjustments are to be made on the product outline shown in frame 104. The information written by hand onto the form contains important information about the work that needs to be done when making the clothing adjustments, for example. It will be obvious that while forms such as these are commonly used to record information relating to clothing adjustments, the information shall not be limited to information relating to clothing adjustments. Recording the information shall also not be limited to writing in frames 103 and 104.

Figure 9:
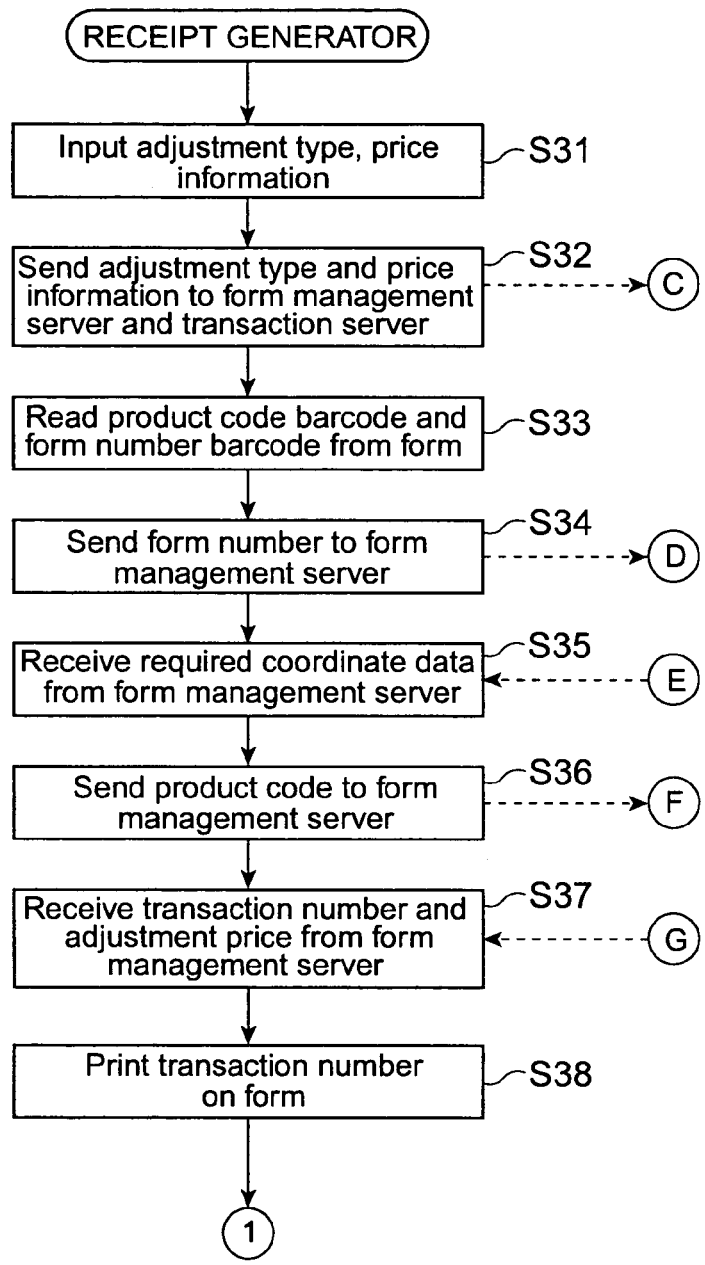
FIG. 9 is a first flow chart of the part of the receipt generating process run by the receipt generator.
Figure 10:
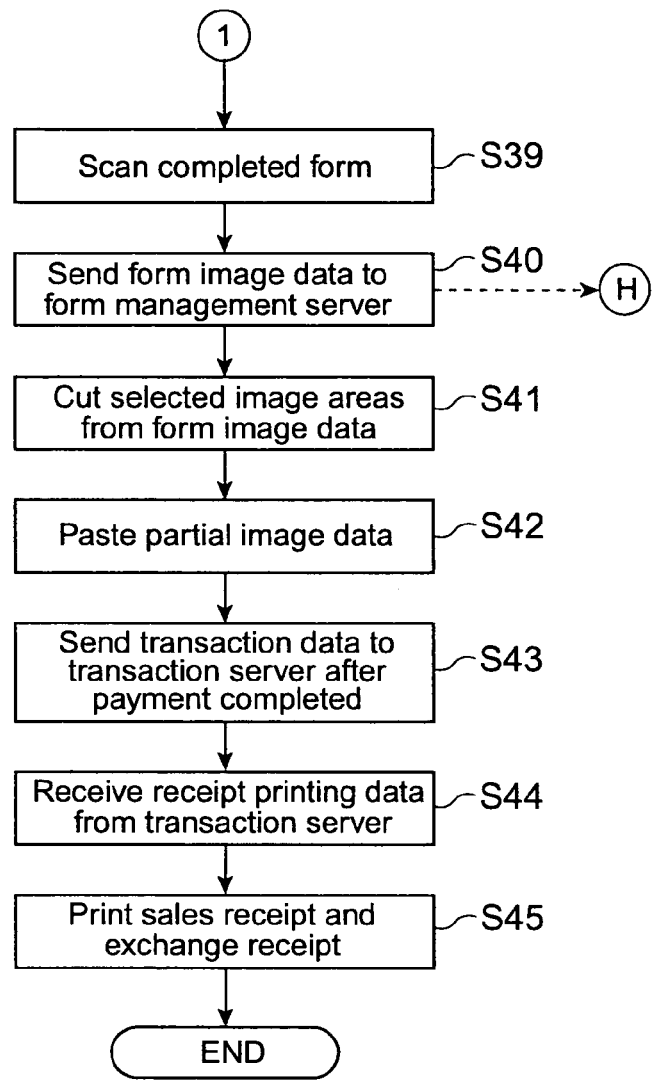
FIG. 10 is a second flow chart continuing the part of the receipt generating process run by the receipt generator.

Of the processes performed by this form processing system, the form reading process for reading the completed form described above and the receipt generating process for issuing a customer receipt are described next with reference to FIG. 9 to FIG. 13. This form reading process and receipt generating process are executed primarily by the receipt generator 5, form management server 2, and transaction server 3. FIG. 9 and FIG. 10 are flow charts of the parts of the receipt generating process run on the receipt generator 5 side, and FIG. 11 is a flow chart showing the steps of this process run on the form management server 2 side.

As shown in FIG. 9 this process starts with the operator entering the type of adjustment and price information using the input device of the data configurator 55 of the receipt generator 5 (step S31) before the completed form is scanned. The adjustment type depends on the adjustments to be made, and the price information corresponds to the price of the adjustment or product purchased by the customer. The adjustment type and price information entered in step S31 is then sent over the network 1 to form management server 2 (step S32).

The product code barcode from frame 105 and the form number barcode from frame 106 are then read from the completed form by the barcode reader 53 of receipt generator 5 (step S33), and the product code of the purchased product and the form number of the completed form are extracted. The controller 51 then sends the form number obtained in step S33 over the network 1 to form management server 2 (step S34).

Figure 11:
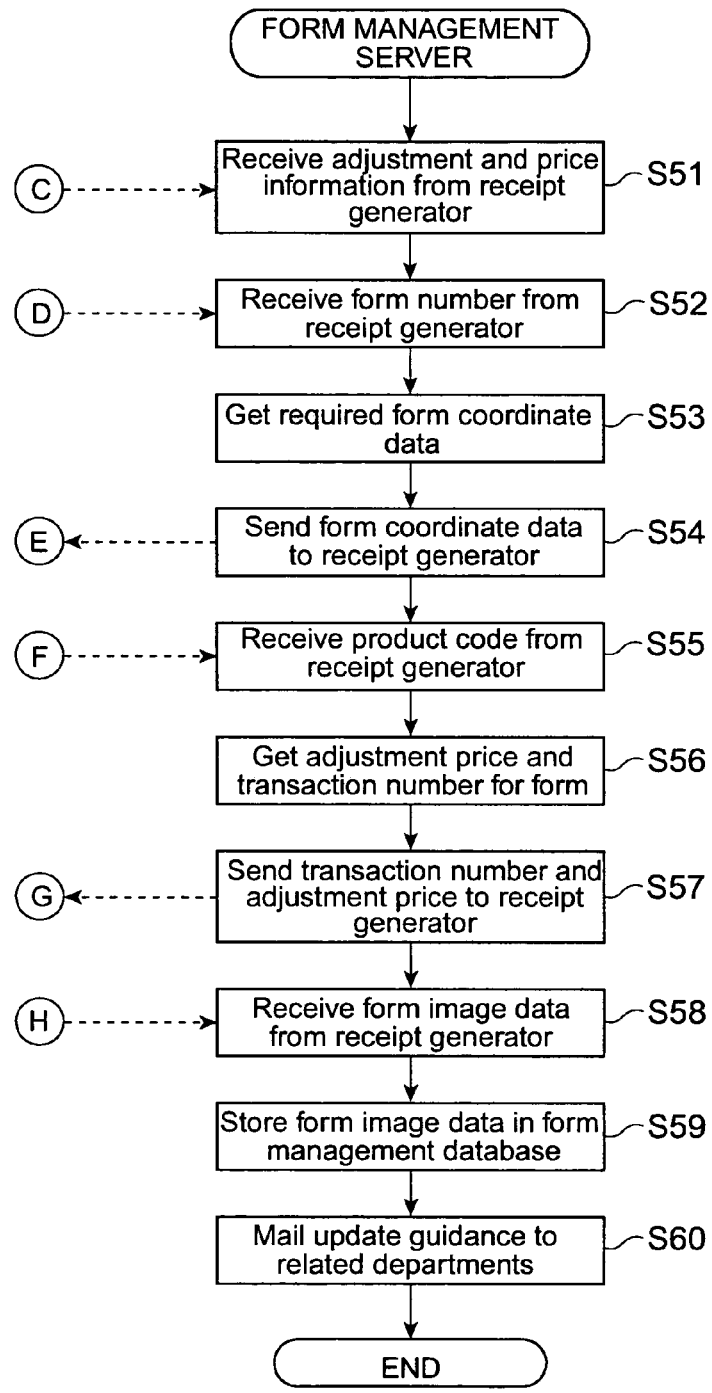
FIG. 11 is a flow chart showing the part of the receipt generating process run by the form management server.

As shown in FIG. 11, the form management server 2 receives the adjustment information and price information sent in step S32 (step S51), and then receives the form number sent in step S34 (step S52). The form management server 2 then accesses the form management database 20, and after identifying the form format corresponding to the form number received in step S52 retrieves the form coordinate data for that form format (step S53). It then sends the form coordinate data acquired in step S53 over network 1 to the receipt generator 5 (step S54).

Returning to FIG. 9, the form coordinate data sent from the form management server 2 is received by the receipt generator 5 (step S35). This form coordinate data is later used in the image cropping process applied to the form image data as described below.

The controller 51 then sends the product code extracted in step S33 over network 1 to the form management server 2 (step S36).

Referring again to FIG. 11, the form management server 2 receives the product code sent in step S36 (step S55). The form management server 2 then accesses the form management database 20 and gets the transaction number assigned to the purchase transaction and price information corresponding to the adjustment type based on the information received in steps S51, S52, and S55 (step S56). The form management server 2 then sends the transaction number and price information acquired in step S56 over network 1 to receipt generator 5 (step S57).

Returning again to FIG. 9, the transaction number and tailoring price sent from the form management server 2 are received by the receipt generator 5 (step S37). The transaction number received in step S37 is then printed by the slip printer 58 on the completed form, which is still loaded in the receipt generator 5 (step S38). The transaction number is printed to frame 101 shown in FIG. 7 in this example.

Next, as shown in FIG. 10, the image scanner 54 starts scanning the completed form loaded in the receipt generator 5 in order to capture an image of the completed form (step S39). The image scanner 54 thus outputs form image data for the completed form. This results in a digitized image of the completed form containing the handwritten notes as shown in FIG. 8. The resulting form image data is then sent over network 1 to form management server 2 (step S40).

The controller 51 then runs an image cropping process to extract specific desired parts from the form image data for the scanned form (step S41). This image cropping process determines the part of the image to be extracted based on the form coordinate data received in step S35, and extracts the image data contained within the area identified by these coordinates as a partial image containing the desired information from the form.

Using the form shown in FIG. 8 by way of example, the partial image data containing the information in frames 101, 103, and 104, which is also to be printed on the exchange receipt described below, is extracted by the image cropping process in this embodiment of the invention. While this information is related to the customer and the requested adjustments and is useful to the user, and is thus selected or cut out for use in the paste process described below, the other areas shown in FIG. 8 are not particularly useful to the customer and therefore do not need to be captured in the image cropping process.

After the image cropping process the controller 51 runs a paste process to paste the partial image data acquired in step S41 (step S42). This paste process pastes this partial image data in a specific position in the exchange receipt print data, which is separately prepared for printing an exchange receipt.

A transaction process for processing payment for the purchased product must be run before the receipt generator 5 prints a receipt. Transaction data acquired from processing the customer's purchase and payment is therefore sent over network 1 to the transaction server 3 (step S43).

The transaction server 3 then runs the required transaction process, and sends receipt data reflecting the content of the payment transaction process to the receipt generator 5. The receipt generator 5 thus receives this receipt data via the network 1 (step S44). Note that this receipt data is added to the receipt printing data for printing a receipt.

The receipt printer 56 of the receipt generator 5 then runs a printing process using this receipt printing data and exchange receipt printing data, and prints a sales receipt and exchange receipt to be given to the customer (step S45). The receipt generating process thus ends, and the printed sales receipt and exchange receipt are given to the customer.

Examples of the sales receipt and exchange receipt printed by the receipt generator 5 are described next with reference to FIG. 12 and FIG. 13.

FIG. 12 shows a print sample of the sales receipt. In addition to store information, a text message, and the sale date, the printed receipt shown in FIG. 12 contains transaction information such as the purchased products, tailoring information, and corresponding price information, and other useful information such as customer point information. It will also be obvious that both the form and content of the print sample shown in FIG. 12 can be changed as desired.

Figure 13:
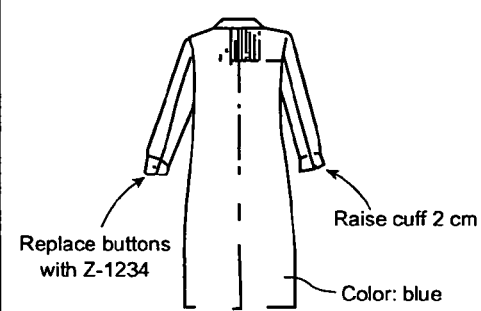
FIG. 13 is a print sample of an exchange receipt accompanying the sales receipt.

FIG. 13 shows a print sample of an exchange receipt issued with the sales receipt. Note that in the sample exchange receipt shown in FIG. 13 the partial image data cut from the form in the image cropping process and containing the customer information, measurement data, and the product image with handwritten notes is pasted into the original exchange receipt format containing store information, for example. As will be known by comparing FIG. 13 and FIG. 8, the pasted partial image data contains the information from frames 101, 103, and 104 in the original completed form.

Referring again to FIG. 11, the form image data sent from the receipt generator 5 in step S40 is received by the form management server 2 (step S58). The form management server 2 then sequentially stores the received form image data in the form image data table 20k of form management database 20 (step S59).

The stored form image data can then be referenced from another terminal over the network 1.

The form management server 2 then sends e-mail to the relevant departments at a specified time to report that the form image data has been updated (step S60). This e-mail message is generated from form update information from the update guidance information table 20l, and it is only necessary to select the addressees shown in the department list described above.

The form processing system according to the present invention as described above can thus generate form printing data using form format and form configuration data stored in the form management database 20 of the form management server 2, and the form printer 4 can print a form appropriate to the product purchased by the customer. It is therefore not necessary to prepare a variety of preprinted forms, and the desired forms can be printed on-demand at the time products are sold to a customer. Furthermore, because the form format and form elements can be freely combined according to the product and customer, the practical value of the printed forms is increased.

After additional information that has a high likelihood of being referenced later, such as the adjustments to be made to clothing, is recorded on the printed receipt, the form processing system of the present invention can capture an image of the completed form using the image scanner 54 of the receipt generator 5, and thereby generate form image data. This form image data can then be stored in the form management database 20 and accessed over the network 1, and can therefore be effectively used to facilitate the smooth completion of tasks to be done by other departments. In addition, because the receipt generator 5 issues an exchange receipt having the form image data pasted therein together with a sales receipt, important, useful information can be easily conveyed to the customer.

The present invention shall not be limited to the embodiment described above, and can be varied in many ways without departing from the scope of the accompanying claims. For example, the form processing system shown in FIG. 1 processes forms through the interactive operation of a form management server 2, form printer 4, and receipt generator 5 connected to a network 1, but the invention can be applied in various other ways and shall not be limited to the components and connections used in the form processing system described above. For example, the functions of the form management server 2, form printer 4, and receipt generator 5 can be achieved in a single terminal device. A larger number of devices could also be used to achieve the same function. The image scanner 54 of the receipt generator 5 could, for example, be a separate device.

As described above, this invention prints a form appropriate to the purchased product, and stores form image data generated by scanning a completed form containing additional information recorded on the printed form. The work and cost involved with handling forms generated in conjunction with product sales are therefore reduced and the form image data can be used more efficiently, thereby increasing overall productivity.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A form processing system for processing forms generated in conjunction with product sales, comprising:
    a form printing means for printing a form using a form format suitable to a product purchased by a customer and specific form configuration data added to the form format;
    a form reading means for reading a completed form having additional information relating to a product sale recorded on a form previously printed by the form printing means, and generating form image data;
    a form image storage means for storing form image data generated by the form reading means; and
    a receipt generating means for generating a receipt containing sales transaction information for a purchased product,
    the receipt generating means generating an exchange receipt containing a partial image of the completed form in conjunction with the receipt.

2. A form processing system according to claim 1, wherein the receipt generating means cuts a specific area from the form image data generated by the form reading means to extract a part of the form image data, and generates the exchange receipt using exchange receipt printing data into which the extracted part of the form image data is pasted.

3. A form processing system according to claim 1, wherein the form configuration data includes customer information about a registered customer.

4. A form processing system according to claim 1, wherein the form configuration data includes product information about a product for sale.

5. A form processing system according to claim 4, wherein the product information includes a product profile to be displayed on a form.

6. A form processing system according to claim 1, wherein the form configuration data includes measurement information useful for identifying information related to measurements taken when the purchased product is clothing.

7. A form processing system according to claim 1, wherein the form configuration data includes barcodes corresponding to data to be displayed on a form; and
    the form reading means comprises a barcode reader for reading the barcodes.

8. A form processing system according to claim 7, wherein the barcodes include barcodes for product codes assigned to individual products, and barcodes for form numbers assigned to individual forms.

9. A form processing system according to claim 1, further comprising a common network that connects the form printing means, form reading means, and form image storage means, and a terminal connected to the network that can reference the form image data stored in the form image storage means.

10. A form processing system for processing forms generated in conjunction with product sales, comprising:
    a form printing unit that prints a form using a form format suitable to a product purchased by a customer and specific form configuration data added to the form format;
    a form reading unit that reads a completed form having additional information relating to a product sale recorded on a form previously printed by the form printing unit, and that generates form image data;
    a form image storage unit that stores form image data generated by the form reading unit; and
    a receipt generating unit that generates a receipt containing sales transaction information for a purchased product,
    the receipt generating unit generating an exchange receipt containing a partial image of the completed form in conjunction with the receipt.

11. A form processing system according to claim 10, wherein the receipt generating unit cuts a specific area from the form image data generated by the form reading unit to extract a part of the form image data, and generates the exchange receipt using exchange receipt printing data into which the extracted part of the form image data is pasted.

12. A form processing system according to claim 10, wherein the form configuration data includes customer information about a registered customer.

13. A form processing system according to claim 10, wherein the form configuration data includes product information about a product for sale.

14. A form processing system according to claim 13, wherein the product information includes a product profile to be displayed on a form.

15. A form processing system according to claim 10, wherein the form configuration data includes measurement information useful for identifying information related to measurements taken when the purchased product is clothing.

16. A form processing system according to claim 10, wherein the form configuration data includes barcodes corresponding to data to be displayed on a form; and the form reading unit comprises a barcode reader that reads the barcodes.

17. A form processing system according to claim 16, wherein the barcodes include barcodes for product codes assigned to individual products, and barcodes for form numbers assigned to individual forms.

18. A form processing system according to claim 10, further comprising a common network that connects the form printing unit, form reading unit, and form image storage unit, and a terminal connected to the network that can reference the form image data stored in the form image storage unit.

19. A form processing method for processing forms generated in conjunction with product sales, comprising:

printing a form using a form format suitable to a product purchased by a customer and specific form configuration data added to the form format;

scanning a completed form having additional information relating to a product sale recorded on a form previously printed, and generating form image data;

generating a receipt containing sales transaction information, and an exchange receipt containing an image of part of the completed form; and storing the generated form image data in a storage unit.

20. A form processing method according to claim 19, wherein generating the receipt comprises:

cutting a specific area from the generated form image data and extracting partial image data; and pasting the partial image data into exchange receipt printing data to generate an exchange receipt.

* * * * *